US009608902B2

(12) United States Patent
Malik et al.

(10) Patent No.: US 9,608,902 B2
(45) Date of Patent: Mar. 28, 2017

(54) COMMUNICATION MECHANISM IN A NETWORK OF NODES WITH MULTIPLE INTERFACES

(75) Inventors: Rahul Malik, Bangalore (IN); Etan Gur Cohen, San Francisco, CA (US); Steven J. Kuhn, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1013 days.

(21) Appl. No.: 13/495,892

(22) Filed: Jun. 13, 2012

(65) Prior Publication Data

US 2013/0148655 A1 Jun. 13, 2013

Related U.S. Application Data

(60) Provisional application No. 61/497,900, filed on Jun. 16, 2011.

(51) Int. Cl.
| | |
|---|---|
| *H04W 88/06* | (2009.01) |
| *H04L 12/721* | (2013.01) |
| *H04L 12/46* | (2006.01) |
| *H04L 12/707* | (2013.01) |
| *H04L 29/12* | (2006.01) |

(52) U.S. Cl.
CPC .......... *H04L 45/72* (2013.01); *H04L 12/4625* (2013.01); *H04L 12/4633* (2013.01); *H04L 45/22* (2013.01); *H04L 61/106* (2013.01); *H04L 61/6004* (2013.01); *H04L 61/6022* (2013.01)

(58) Field of Classification Search
None
See application file for complete search history.

(56) References Cited

U.S. PATENT DOCUMENTS

| 6,222,822 B1 | 4/2001 | Gerardin et al. |
| 6,493,331 B1 | 12/2002 | Walton et al. |
| (Continued) | | |

FOREIGN PATENT DOCUMENTS

| CN | 1433190 | 7/2003 |
| CN | 103597780 | 2/2014 |
| (Continued) | | |

OTHER PUBLICATIONS

"Korean Patent Application No. 10-2014-7001258, KIPO Notice of Grounds for Rejection", Sep. 22, 2014, 5 pages.
(Continued)

*Primary Examiner* — Chirag Shah
*Assistant Examiner* — Jenkey Van
(74) *Attorney, Agent, or Firm* — DeLizio Law, PLLC

(57) ABSTRACT

A path selection unit selects a network communication path from a plurality of available network communication paths for transmitting data from a hybrid network device to a destination network device. A packet transmit unit determines path connection characteristics associated with the selected network communication path. The packet transmit unit generates a hybrid network packet for transmitting the data to the destination network device based, at least in part, on the path connection characteristics associated with the selected network communication path. The packet transmit unit transmits the hybrid network packet to the destination network device via the selected network communication path.

31 Claims, 9 Drawing Sheets

(56) References Cited

U.S. PATENT DOCUMENTS

| | | | |
|---|---|---|---|
| 6,577,630 | B1* | 6/2003 | Markwalter et al. ......... 370/392 |
| 6,744,768 | B2 | 6/2004 | Vikberg et al. |
| 6,952,401 | B1 | 10/2005 | Kadambi et al. |
| 7,039,715 | B2 | 5/2006 | England et al. |
| 7,047,310 | B2 | 5/2006 | Bedekar et al. |
| 7,085,234 | B2 | 8/2006 | Kimball et al. |
| 7,237,034 | B2 | 6/2007 | Clarke et al. |
| 7,239,608 | B2 | 7/2007 | Sreejith et al. |
| 7,430,167 | B2 | 9/2008 | Glaise et al. |
| 7,508,763 | B2 | 3/2009 | Lee |
| 7,742,497 | B2 | 6/2010 | Ganti et al. |
| 7,899,929 | B1* | 3/2011 | Beser ............................ 709/238 |
| 8,014,278 | B1 | 9/2011 | Subramanian et al. |
| 8,284,668 | B2 | 10/2012 | Matsuo |
| 8,526,317 | B2 | 9/2013 | Leconte et al. |
| 2002/0131411 | A1* | 9/2002 | Bhatia ........................... 370/389 |
| 2003/0016668 | A1* | 1/2003 | Mugica et al. ............... 370/392 |
| 2004/0029553 | A1 | 2/2004 | Cain |
| 2004/0133704 | A1 | 7/2004 | Krzyzanowski et al. |
| 2004/0218557 | A1 | 11/2004 | Kim et al. |
| 2005/0007955 | A1 | 1/2005 | Schrodi |
| 2005/0053006 | A1* | 3/2005 | Hongal et al. ............. 370/236.2 |
| 2005/0063355 | A1* | 3/2005 | Iwamura ................ H04B 3/542 370/351 |
| 2005/0185587 | A1* | 8/2005 | Klinker ............... H04L 12/4633 370/237 |
| 2005/0213506 | A1 | 9/2005 | Wakumoto et al. |
| 2006/0250959 | A1 | 11/2006 | Porat |
| 2007/0223391 | A1 | 9/2007 | Kuroki et al. |
| 2008/0259888 | A1 | 10/2008 | Terashima |
| 2009/0238074 | A1 | 9/2009 | Vasseur et al. |
| 2009/0303882 | A1 | 12/2009 | Tanaka et al. |
| 2010/0296497 | A1* | 11/2010 | Karaoguz et al. ............ 370/338 |
| 2010/0309912 | A1* | 12/2010 | Mehta ................. H04L 12/4625 370/390 |
| 2011/0110248 | A1 | 5/2011 | Koitabashi et al. |
| 2011/0119360 | A1* | 5/2011 | Kish et al. .................... 709/221 |
| 2012/0106441 | A1* | 5/2012 | Juneja ................ H04L 12/4625 370/328 |
| 2012/0320919 | A1 | 12/2012 | Baliga et al. |
| 2012/0320924 | A1 | 12/2012 | Baliga et al. |
| 2013/0039173 | A1 | 2/2013 | Ehsan et al. |

FOREIGN PATENT DOCUMENTS

| | | |
|---|---|---|
| EP | 2107733 A1 | 10/2009 |
| JP | 04004635 | 1/1992 |
| JP | 2007281549 | 10/2007 |
| JP | 2008177875 | 7/2008 |
| JP | 2008193305 | 8/2008 |
| JP | 2008270870 | 11/2008 |
| JP | 2008270999 | 11/2008 |
| JP | 2008271000 | 11/2008 |
| JP | 2008271000 | 11/2008 |
| JP | 2010525690 | 7/2010 |
| KR | 1020050042784 | 5/2005 |
| KR | 1020140024051 | 2/2014 |
| WO | 2012174305 | 12/2012 |
| WO | 2012174443 | 12/2012 |
| WO | 2012174447 | 12/2012 |

OTHER PUBLICATIONS

"International Application No. PCT/US/2012/042767 International Preliminary Report on Patentability", Nov. 6, 2013, 10 pages.

"International Application No. PCT/US/2012/042767 Written Opinion of the IPEA", Jun. 10, 2013, 6 pages.

"PCT Application No. PCT/US2012/042546 International Preliminary Report on Patentability", Oct. 15, 2013, 6 pages.

"PCT Application No. PCT/US2012/042546, Written Opinion of the IPEA", Jul. 16, 2013, 5 pages.

"U.S. Appl. No. 13/339,847 Office Action", Oct. 16, 2013, 15 pages.

Application as Filed in U.S. Appl. No. 61/497,900, Rahul Malik, Communication mechanism in a network of nodes with multiple interfaces, dated Jun. 16, 2011.

Application as Filed in U.S. Appl. No. 61/498,206, Roshan Baliga, Coordinated back-off mechanism for path selection in hybrid communication networks, dated Jun. 17, 2011.

Application as Filed in U.S. Appl. No. 61/498,250, Roshan Baliga, Autonomous path selection in hybrid communication networks, dated Jun. 17, 2011.

Docwiki, "Border Gateway Protocol", Cisco, IOS Technology Handbook, Dec. 17, 2009, pp. 1-7, http://docwiki.cisco.com/wiki/Border_Gateway_Protocol.

International Search Report and Written Opinion—PCT/US2012/042546—ISA/EPO—Oct. 8, 2012.

PCT Application No. PCT/US12/42767 International Search Report, Sep. 24, 2012, 13 pages.

PCT Application No. PCT/US12/42772 International Search Report, Sep. 24, 2012, 10 pages.

"Japanese Patent Application No. 2014516006, Office Action", 6 pages.

* cited by examiner

| HYBRID CONTROL PROTOCOL VERSION ~410 | HYBRID CONTROL TYPE ~415 | HYBRID CONTROL LENGTH ~420 | SEQUENCE NUMBER ~430 | FRAGMENT NUMBER ~440 | LAST FRAGMENT ~445 |
|---|---|---|---|---|---|

401   HYBRID CONTROL FIELD

FIG. 4

| DA ~511 | SA ~512 | VLAN TAG ~513 | ETHERTYPE ~514 | PAYLOAD ~515 | CRC ~516 |

HEADER 521

SOURCE PACKET SEGMENT 523

SOURCE PACKET 525

| HYBRID DA ~530 | HYBRID SA ~532 | HYBRID VLAN TAG ~534 | VLAN TAG ~536 | ETHER TYPE ~538 | PAYLOAD ~540 | CRC ~542 |

HYBRID HEADER 551

SOURCE PACKET SEGMENT 553

HYBRID LAN PACKET 555

FIG. 5A

COMMUNICATION MECHANISM IN A NETWORK OF NODES WITH MULTIPLE INTERFACES

RELATED APPLICATIONS

This application claims the priority benefit of U.S. Provisional Application No. 61/497,900 filed Jun. 16, 2011.

BACKGROUND

Embodiments of the inventive subject matter generally relate to the field of communication networks, and, more particularly, to a communication mechanism in a network of nodes with multiple interfaces.

Computer networks can provide connectivity in home and office environments between a variety of network devices (e.g., an Ethernet device, a Powerline Communication device, etc.). Ethernet is the most commonly deployed network technology, and even alternate Local Area Network (LAN) technologies typically use Ethernet as an interface or convergence layer. For example, a powerline communication network as per specifications of IEEE P1901 is defined as an Ethernet/powerline bridge with the underlying network packet format being Ethernet. However, a network packet format defined by P1901 is transmitted over the powerline communication network. A communication network having network devices which utilize multiple LAN technologies is referred to as a hybrid network and a network device in a hybrid network having multiple communication interfaces is referred to as a hybrid device. For communication in a hybrid network, a network packet should be constructed in accordance with the end-point device receiving the network packet and the communication path used to communicate with the end-point device.

SUMMARY

Various embodiments are disclosed of a mechanism for generating a hybrid LAN packet for transmission of data to a destination network device in a hybrid communication network based on path connection characteristics associated with a selected network path. In one embodiment, it is determined to transmit data from a hybrid network device to a destination network device in a hybrid communication network. A network communication path is selected from a plurality of available network communication paths for transmitting the data from the hybrid network device to the destination network device. Path connection characteristics associated with the selected network communication path are determined. A hybrid network packet is generated for transmitting the data to the destination network device based, at least in part, on the path connection characteristics associated with the selected network communication path. The hybrid network packet is transmitted to the destination network device via the selected network communication path.

BRIEF DESCRIPTION OF THE DRAWINGS

The present embodiments may be better understood, and numerous objects, features, and advantages made apparent to those skilled in the art by referencing the accompanying drawings.

FIG. 4 depicts an example concept diagram of a hybrid control field in a hybrid LAN packet generated using an encapsulation technique.

FIG. 5A depicts an example hybrid LAN packet when a packet transmit unit in a hybrid device generates a hybrid LAN packet using VLAN tags.

DESCRIPTION OF EMBODIMENT(S)

Figure 1:
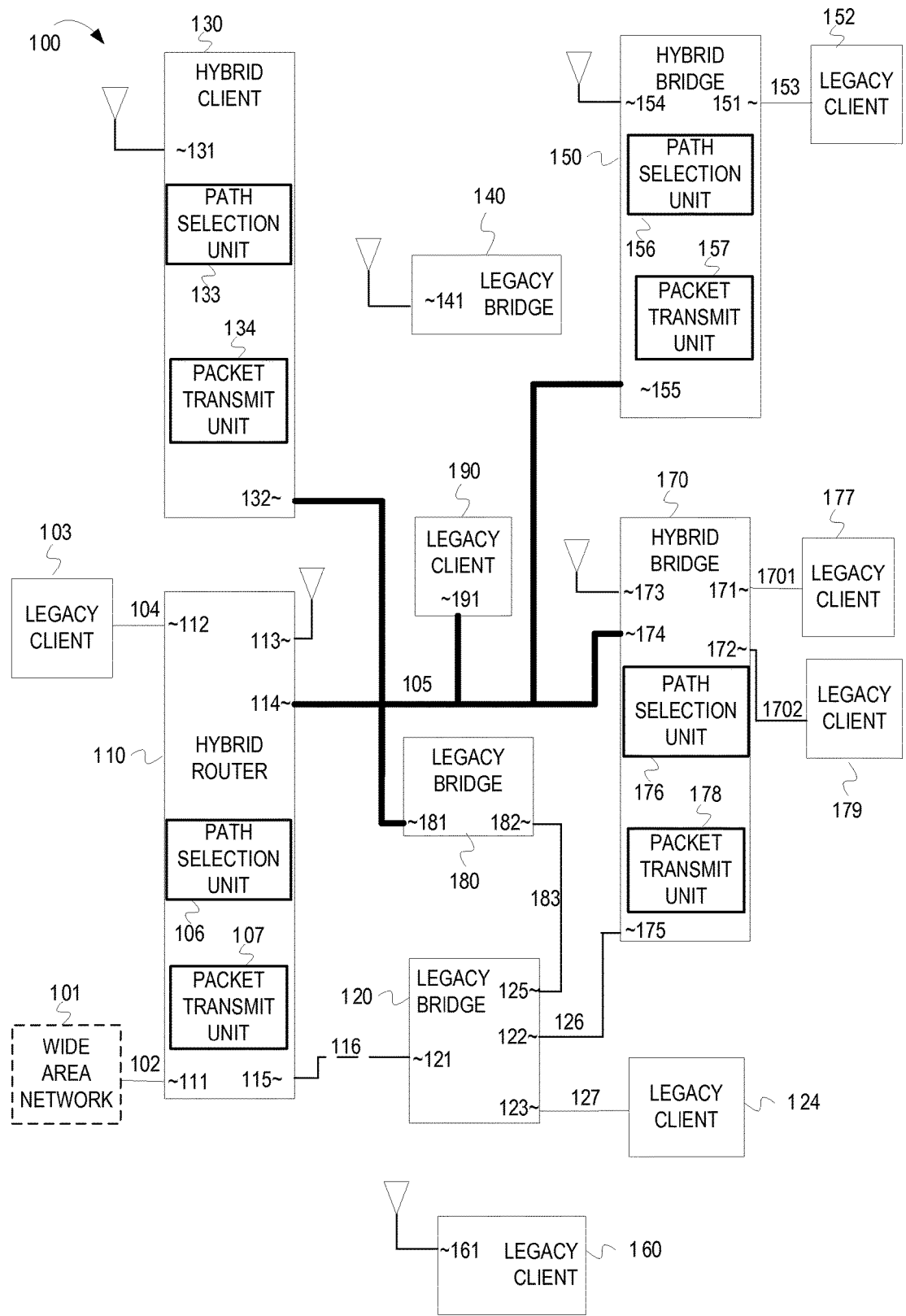
FIG. 1 depicts an example conceptual diagram of a hybrid network.

The description that follows includes exemplary systems, methods, techniques, instruction sequences and computer program products that embody techniques of the present inventive subject matter. However, it is understood that the described embodiments may be practiced without these specific details. For instance, although examples refer to a path selection unit and a packet transmit unit to select a path and transmit a network packet in a hybrid network, embodiments are not so limited. In some implementations, the operations associated with the path selection unit and/or the packet transmit unit may be performed by one or more additional or different units in the hybrid device. In other instances, well-known instruction instances, protocols, structures and techniques have not been shown in detail in order not to obfuscate the description.

In some embodiments, a hybrid device can be configured to select one of the multiple communication paths to communicate with a network device in a hybrid network. The hybrid device can also generate a hybrid LAN packet (using a source packet, e.g., an Ethernet packet) to be transmitted over the selected communication path. For example, the hybrid device may select the communication path in order to optimize several parameters (e.g., reliability, load balancing, packet loss rate, throughput, jitter, etc.). In some implementations, after selecting the communication path, the hybrid device determines path connection characteristics associated with the selected communication path. For example, the hybrid device may determine whether the selected communication path is a bridged path or an un-bridged path to the destination device. The hybrid device also determines whether the destination device is a directly connected device (with respect to the hybrid device transmitting a network packet) on the selected communication path. The hybrid device then determines a format for the hybrid LAN packet that will be transmitted based on the characteristics of the selected communication path. When the selected communication path is an un-bridged path, the hybrid device generates a hybrid LAN packet which is similar to the source packet. When the selected communication path is a bridged path to a directly connected device, the hybrid device generates a hybrid LAN packet by replacing the source address in the source packet with a hybrid source address (as will be further described below with reference to FIG. 6). When the selected communication path is a bridged path to a hybrid device, the hybrid device generates a hybrid LAN packet using an encapsulation technique (see FIGS. 3 and 4) or using virtual LAN (VLAN) tags (see FIGS. 5A and 5B). When the selected communication path is a path to a directly connected device via another hybrid device, the hybrid device generates a hybrid LAN packet using the encapsulation technique (see FIGS. 3 and 4) or using the virtual LAN (VLAN) tags (see FIGS. 5A and 5B). After generating the hybrid LAN packet, the hybrid device transmits the hybrid LAN packet on the selected communication path.

FIG. 1 depicts an example conceptual diagram of a hybrid network 100. The hybrid network 100 may include hybrid devices and legacy (or non-hybrid) devices. In some embodiments, a hybrid device typically includes one or more hybrid communication interfaces (HCIs), a path selection unit, and a packet transmit unit. The path selection unit and the packet transmit unit in the hybrid device perform operations to select a communication path and generate a hybrid LAN packet based on the selected communication path, as will be further described below. An HCI is a network interface/port on a hybrid device that is connected to at least one other hybrid device, either directly or via one or more legacy bridges (LBs). An LB provides connectivity between multiple devices/segments of a LAN. The LB can offer connectivity between two different LAN technologies, e.g., an Ethernet-Powerline networking bridge; or between the same LAN technology, e.g., a multi-port Ethernet switch; or a wireless LAN (WLAN) repeater. As illustrated in FIG. 1, the hybrid network 100 includes a hybrid client 130 having a path selection unit 133, a packet transmit unit 134, a powerline communication interface 132, and a wireless LAN (WLAN) port 131; and a hybrid bridge (HB) 150 having a WLAN port 154, an Ethernet port 151, a powerline communication interface 155, a path selection unit 156, and a packet transmit unit 157. The hybrid network 100 also includes a hybrid router 110 having a WLAN port 113, a powerline communication interface 114, a coaxial cable interface 115, an Ethernet port 111 connected to a wide area network (WAN) 101 via Ethernet cable 102, an Ethernet port 112, a path selection unit 106, and a packet transmit unit 107; and an HB 170 having a WLAN port 173, a powerline communication interface 174, an Ethernet port 175, an Ethernet port 171, an Ethernet port 172, a path selection unit 176 and a packet transmit unit 178. A hybrid router (HR) 110 acts as an interface between the WAN 101 and the hybrid network 100 at the transport layer and offers connectivity to devices in the hybrid network 100 via a plurality of interfaces/LAN technologies. The WAN 101 may be accessed using a broadband access modem (e.g., a digital subscriber line modem). The powerline communication interfaces 132, 155, 174 and 114 are connected to a powerline cable plant 105. The coaxial cable interface 115 is connected to a coaxial cable plant 116. A hybrid device may include one or more local connectivity interfaces (LCIs). An LCI is a network interface/port on a hybrid device that is not connected to another hybrid device. The interfaces/ports 112, 111, 151, 171, 172 represent LCIs with in the respective hybrid devices. The interfaces/ports 113, 114, 115, 154, 155, 131, 132, 173, 174 and 175 represent HCIs in the hybrid devices.

In some implementations, a legacy device is a network device that does not implement a hybrid networking sublayer described below with reference to FIG. 2A. The legacy devices are connected to the hybrid devices via the LCIs. With respect to a hybrid device, a legacy device may be classified as a locally connected device or a directly connected device. A locally connected device, with respect to a hybrid device, is a legacy device connected to an LCI of the hybrid device. The locally connected device can be reached exclusively via the hybrid device. The locally connected device may be connected to the LCI of the hybrid device via one or more LBs. A directly connected device, with respect to a hybrid device, is a legacy device connected to an HCI of the hybrid device. The directly connected device can be reached by other network devices in the hybrid network 100 in addition to being reached by the hybrid device. The directly connected device may be connected to the hybrid device via one or more LBs. The HBs 150 and 170, include features of an LB, and also offer connectivity to locally and directly connected devices in the hybrid network 100.

As shown in FIG. 1, the legacy devices in the hybrid network 100 include a legacy bridge 140 which acts as a WLAN repeater, an LB 180 serving as a powerline/Ethernet bridge, and an LB 120 serving as a coaxial/Ethernet bridge. The LB 140 includes a WLAN port 141 to extend the coverage of the wireless network hosted by the HR 110. The LB 140 bridges network packets received at the WLAN port 141, and allows the HB 150 to connect wirelessly to the HR 110. The LB 180 includes a powerline communication interface 181 connected to the powerline cable plant 105 and an Ethernet port 182. The LB 180 bridges the powerline cable plant 105 connected with its powerline communication interface 181 to its Ethernet port 182. The LB 120 includes a coaxial cable interface 121 connected to the coaxial cable interface 115 of the HR 110 via a coaxial cable plant 116. The LB 120 also includes Ethernet ports 125, 122 and 123. The Ethernet port 125 is connected to the Ethernet port 182 of the LB 180 via an Ethernet cable 183. The Ethernet port 122 is connected to the Ethernet port 175 of the HB 170 via an Ethernet cable 126. The LB 120 bridges its coaxial cable interface 121 to the Ethernet ports 122, 123 and 125. A legacy client (LC) is a network device that acts as a data source or a data sink. An LC may have one or more interfaces offering connectivity but the LC utilizes one of the available interfaces at any instance in time. The legacy devices in the hybrid network 100 also include an LC 103 connected to the HR 110 via an Ethernet cable 104 at the LCI 112, an LC 190 connected to the powerline cable plant 105 at the powerline communication interface 191, an LC 160 having a WLAN port 161, an LC 124 connected to the LB 120 via an Ethernet cable 127 at the Ethernet port 123, an LC 179 connected to the HB 170 via an Ethernet cable 1702 at the LCI 172, an LC 177 connected to the HB 170 via an Ethernet cable 1701 at the LCI 171, and an LC 152 connected to the HB 150 via an Ethernet cable 153 at the LCI 151. The HC 130 may be a source/sink end-point client hybrid device that connects to the hybrid network 100 via one or more HCIs. The HC 130 may offer connectivity to a directly connected LC device.

It is noted that the hybrid network 100 depicted in FIG. 1 is not limited to utilizing Ethernet as the underlying connectivity technology and hence the source packets are not limited to Ethernet packets. In some implementations, the hybrid network 100 can utilize an alternate LAN technology (e.g., WLAN), and the LCIs in the hybrid network can be implemented using WLAN ports instead of Ethernet ports. The format of the source packets is in accordance with the connectivity technology utilized.

In some implementations, the path selection units 106, 133, 156 and 176 can select the path to a destination device from a database of paths. The packet transmit units 134, 107, 157 and 178 generate network packets to be transmitted based on the network packets received from a source and the selected communication path to the destination device. The hybrid devices (i.e., the HC 130, the HR 110, the HB 150 and the HB 170) in the hybrid network 100 perform a network topology discovery when the hybrid network 100 is established or another hybrid device joins the hybrid network 100. In one implementation of the network topology discovery, the hybrid devices determine (i) the ports by which the hybrid devices are connected to other hybrid devices; (ii) the end-point LC devices connected to the local connectivity ports of the respective hybrid device; and (iii) the existence of a bridged path by an LB(s) across two HCIs of a hybrid device.

Figure 2A:
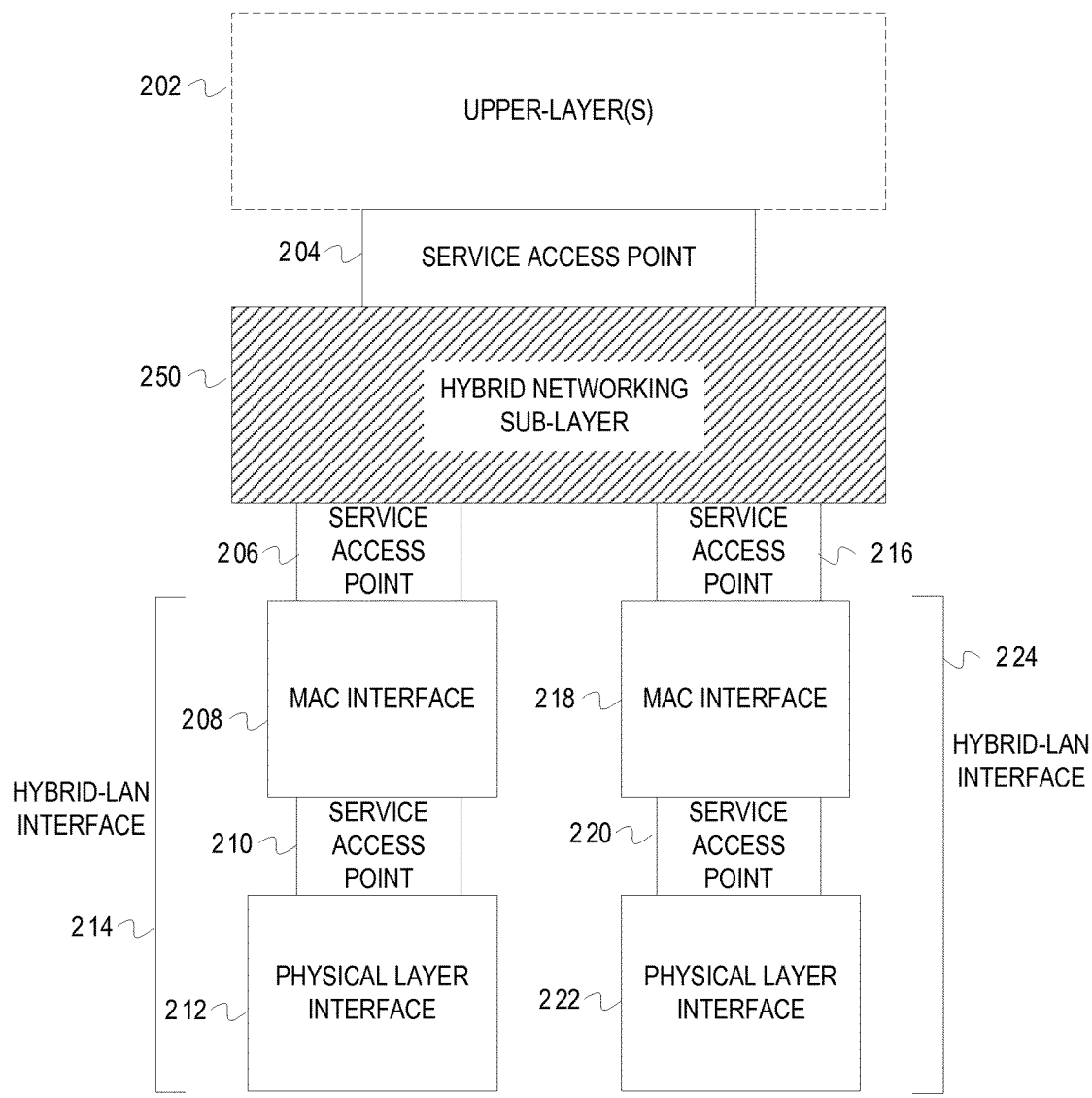
FIG. 2A illustrates an example architecture of a hybrid device in a hybrid network.

FIG. 2A illustrates an example architecture of a hybrid device in a hybrid network 100, as described above with reference to FIG. 1. FIG. 2A includes a hybrid networking sub-layer 250 and an upper-layer(s) 202 (e.g., a data-link bridging sub-layer, an IP sub-layer, an application sub-layer, etc.). The upper-layer(s) 202 are interfaced to the hybrid networking sub-layer 250 via a service access point (SAP) 204. MAC interfaces 208 and 218 are interfaced to physical (PHY) layer interfaces 212 and 222 via PHY-SAPs 210 and 220 respectively. The MAC interface 208, the PHY-SAP 210 and the PHY layer interface 212 together constitute a Hybrid LAN interface 214. Similarly, the MAC interface 218, the PHY-SAP 220 and the PHY layer interface 222 together constitute a hybrid LAN interface 224. Although not depicted in FIG. 2A, separate SAPs may exist for data and control paths. The Hybrid LAN interfaces 214 and 224 are interfaced to the hybrid networking sub-layer 250 via SAPs 206 and 216, respectively. In some implementations, the hybrid networking sub-layer 250 allows masking the hybrid-networking functionality of the hybrid device (e.g., generating data network packets for communication on a selected communication path to a destination device) from the upper-layer(s) 202. The hybrid networking sub-layer 250 presents itself as a single MAC/PHY sub-layer to the upper-layer(s) 202. Also, the hybrid networking sub-layer 250 presents itself as a single upper-layer to the hybrid LAN interfaces 214 and 224.

FIG. 2A depicts a single SAP providing connectivity between various sub-layers in the architecture of the hybrid networking device. However, in some implementations, the sub-layers may have separate SAPs for management, control and data. Also, in some examples, the SAP 204 between the hybrid networking sub-layer 250 and the upper-layer(s) 202, and the SAPs 206 and 216 between the hybrid networking sub-layer 250 and the hybrid LAN interfaces 214 and 224 are Ethernet SAPs. However, when Ethernet is not the underlying connectivity technology, one or more of the SAPs depicted in FIG. 2A may correspond to another format (e.g., IEEE 802.11) based on the underlying connectivity technology utilized in the hybrid network 100. The hybrid networking sub-layer 250 may be responsible for translating data to the appropriate SAP format in accordance with the destination of the data.

In some implementations, among other functionalities, the hybrid networking sub-layer 250 is responsible for performing topology discovery in the hybrid network. The functionalities of the hybrid networking sub-layer 250 include selecting a suitable communication path for a traffic flow to the destination device and bridging network packets across hybrid connectivity interfaces. The hybrid networking sub-layer 250 also translates network packets received from the upper-layer(s) 202 to hybrid-LAN packets for transmission on the hybrid network 100, and vice-versa on reception of hybrid LAN packets. In some implementations, the path selection unit and packet transmit unit of hybrid devices in the hybrid network (e.g., hybrid router 110 of FIG. 1) can implement the hybrid networking sub-layer 250 to select the transmission path within the hybrid network 100 and generate hybrid LAN packets, as will be described below with reference to FIG. 2B.

Figure 2B:
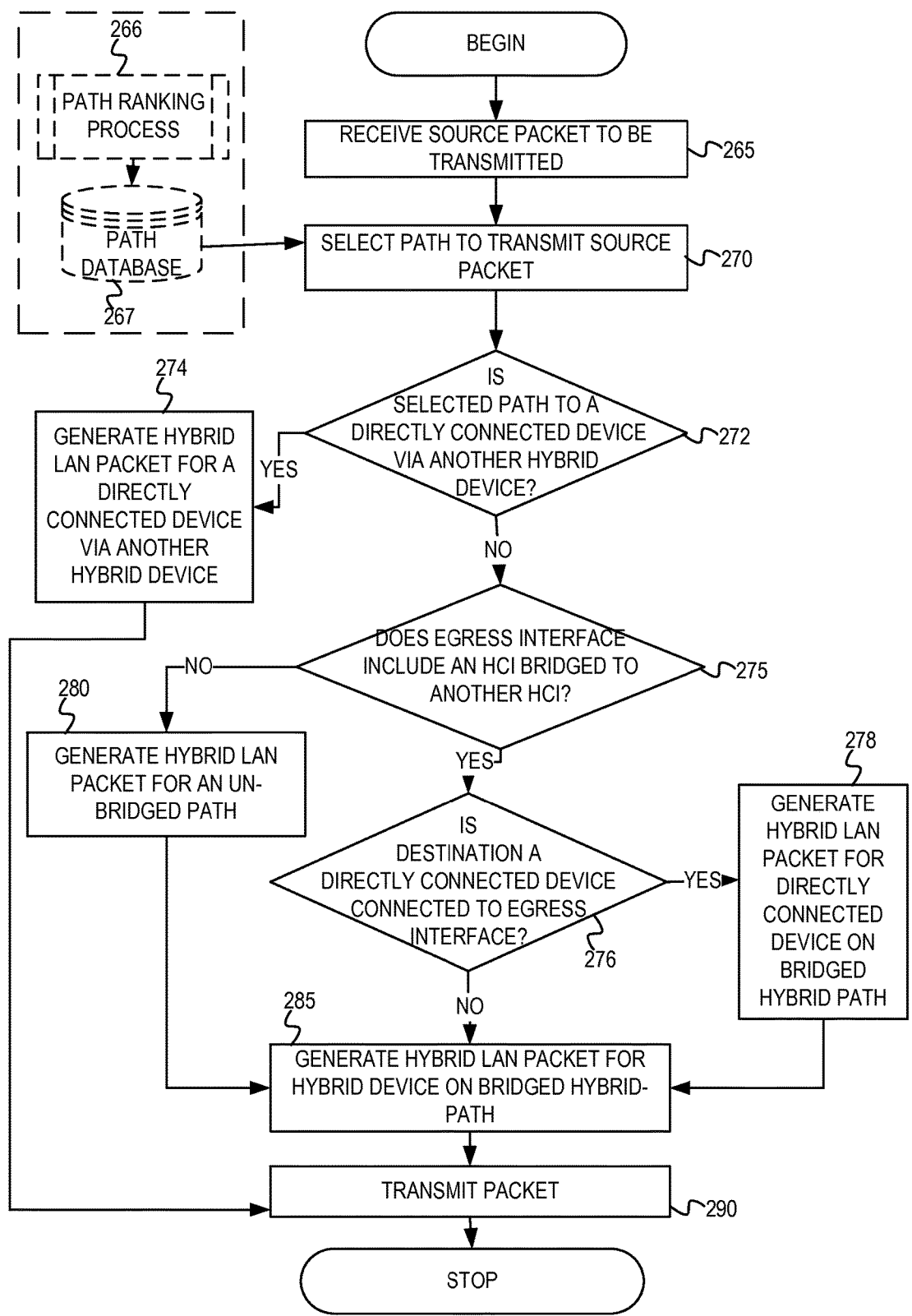
FIG. 2B illustrates a flow diagram of example operations to generate a hybrid LAN packet for transmission of data to a destination network device in a hybrid network based on path connection characteristics associated with a selected network path.

FIG. 2B illustrates a flow diagram of example operations to generate a hybrid LAN packet for transmission of data to a destination network device in a hybrid network based on path connection characteristics associated with a selected network path.

At block 265, a source packet at a hybrid device of the hybrid network 100 is scheduled for transmission to a destination network device. The source packet may originate at a locally connected device with respect to a hybrid device, at a directly connected device with respect to the hybrid device, or within the hybrid device. The source packet can be an Ethernet Packet or another type of hybrid networking packet. In some examples, the source packet may be from the SAP 204, or internally within the hybrid networking sub-layer 250 (e.g., when the hybrid networking sub-layer 250 bridges a packet across interfaces). In some examples, when the source packet originates from within the hybrid device (e.g., a hybrid client), the data or payload associated with the source packet may originate within the hybrid device and may be scheduled for transmission to a destination device.

At block 270, a network path is selected to transmit the source packet on the hybrid network 100. In some implementations, the path selection unit of a hybrid device (e.g., the path selection unit 106 of the HR 110) may select the network path from a path database 267. The path database 267 may include network paths ranked on the basis of multiple parameters (e.g., throughput, delay, jitter, etc.) between the devices in the hybrid network 100 using the path ranking process 266. In some implementations, the devices in the hybrid network 100 can exchange information about network topology and network conditions (e.g., number of hops on a network path, delay on a network path, etc.). During the path ranking process 266, the devices in the hybrid network 100 can utilize the information about network topology and network conditions to rank the various available paths. For example, when multiple network paths are available between a hybrid device A and a hybrid device B, one of the hybrid devices (e.g., the hybrid device A), can rank the network paths based on the detected path delays. In other examples, the hybrid device A or the hybrid device B can rank the paths based on other network conditions (e.g., jitter, etc.). In one implementation, the hybrid devices in the hybrid network 100 rank the network paths in the path database 267 when the hybrid network 100 is setup or when new devices join the hybrid network 100. In some examples, the path selection unit reads the source address (SA) and the destination address (DA) in the source packet and selects a communication path from the path database 267. It is noted, however, that in some implementations, the Network Layer parameters (e.g., quality of service, etc.) and the Transport Layer parameters (e.g., reliability, flow control, etc.) may also influence the path selection at block 270.

At block 272, it is determined whether the path selected at block 270 is a path to a directly connected device via another hybrid device in the hybrid network 100. In some implementations, the packet transmit unit of the hybrid device (e.g., the packet transmit unit 107 of the HR 110) may determine whether the path selected at block 270 is a path to a directly connected device via another hybrid device. If the selected path is a path to a directly connected device via another hybrid device, control flows to block 274. If the selected path is not a path to a directly connected device via another hybrid device, control flows to block 275.

At block 274, a hybrid LAN packet is generated for transmission to a directly connected device via another hybrid device in the hybrid network 100. In some implementations, the packet transmit unit of the hybrid device may generate the hybrid LAN packet.

With reference to FIG. 1, as described above, the LC 190 is a directly connected device with respect to the hybrid devices HR 110, HC 130, HB 150 and HB 170. In one example, when the HC 130 is scheduled to send a network packet to the LC 190, the path selection unit 133 in the HC 130 determines that the LC 190 is directly connected to the HC 130 via the powerline communication interface 132. However, due to channel conditions, network load, etc., the LC 190 may be optimally reached through other communication paths. For example, the path selection unit 133 may determine that the LC 190 could be optimally reached via the HR 110 using the communication path including the powerline communication interface 132, the powerline communication interface 114, and the powerline communication interface 191. The path selection unit 133 may also determine that the LC 190 can be reached via the HR 110 using the communication path including the WLAN port 131, the WLAN port 113, the powerline communication interface 114, and the powerline communication interface 191. For both the communication paths, the packet transmit unit 134 in the HC 130 can either utilize the encapsulation technique (described in FIG. 3 and FIG. 4) or the VLAN tags technique (described in FIGS. 5A and 5B) to generate a hybrid LAN packet for transmission to the LC 190 via the powerline communication interface 114 of the HR 110. The packet transmit unit 107 in the HR 110 generates a network packet on receiving the hybrid LAN packet from the HC 130 for transmission to the LC 190 via the powerline communication interface 114.

At block 275, it is determined whether the egress interface on the path selected at block 270 includes an HCI bridged to another HCI. In some implementations, the packet transmit unit of the hybrid device determines whether the egress interface on the path selected at block 270 includes an HCI bridged to another HCI. If the path selected at block 270 includes the HCI bridged to another HCI of the hybrid device, control flows to block 276. If the path selected at block 270 does not include a hybrid interface bridged to another hybrid interface of the hybrid device, control flows to block 280.

At block 276, it is determined whether the destination device is a directly connected device connected to the egress interface of the hybrid device. In some implementations, the packet transmit unit of the hybrid device determines whether the destination device is a directly connected device to the egress interface of the hybrid device. If the destination is a directly connected device connected to the egress interface, control flows to block 278. If the destination is not a directly connected device connected to the egress interface, control flows to block 285.

At block 278, a hybrid LAN packet is generated for the directly connected device on the bridged hybrid path. In some implementations, the packet transmit unit of the hybrid device generates the hybrid LAN packet for the directly connected device on the bridged hybrid path. For example, the packet transmit unit 107 of the HR 110 generates a hybrid LAN packet for a source packet originating from the LC 103 destined to the LC 124. In one implementation, the packet transmit unit generates a hybrid LAN packet having the packet format as described below with reference to FIG. 6.

At block 280, a hybrid LAN packet is generated for an un-bridged path. In some implementations, the packet transmit unit of the hybrid device generates a hybrid LAN packet for the un-bridged hybrid path.

In one example, with reference to the hybrid network 100 in FIG. 1, the HR 110 and the HB 150 are bridged by the LB 140 (i.e., via the WLAN interface). The HR 110 and the HB 150 are also connected via the powerline cable plant 105. The HCIs between the HR 110 and the HB 150 are not bridged by an LB, since the LB 140 acts as a WLAN repeater. When the LC 103 generates a network packet destined to the LC 152, the LC 103 sets the SA field in the network packet as its own MAC ID and the DA field in the network packet as the MAC ID of the LC 152. On receiving the network packet, the path selection unit 106 in the HR 110 can select the WLAN path (between the ports 113 and 154) or the powerline communication path (between the ports 114 and 155) from the HR 110 to the HB 150. In both cases (i.e., whether the path selection unit 106 selects the WLAN path or the powerline communication path), the packet transmit unit 107 in the HR 110 generates a hybrid LAN packet, having the same SA and DA fields as the network packet received from the LC 103. On receiving the hybrid LAN packet, the hybrid networking sub-layer of the HB 150 can send the hybrid LAN packet as a network packet to the LC 152. Similarly, for a network packet in the reverse direction, i.e. originating from the LC 152 and destined to LC 103, the packet transmit unit 157 generates a hybrid LAN packet having the same SA and DA fields as the SA and DA fields in the network packet (and determines whether to send the hybrid LAN packet via the WLAN port 154 to the WLAN port 113 of the HR 110 or via the powerline communication interface 155 to the powerline communication interface 114 of the HR 110.

At block 285, a hybrid LAN packet is generated for a hybrid device on a bridged hybrid path. In some implementations, the packet transmit unit of the hybrid device generates the hybrid LAN packet for a hybrid device on a bridged hybrid path. For example, the packet transmit unit 178 of the HB 170 generates a hybrid LAN packet for transmission to the HR 110 on receiving a source packet from the LC 177 destined to the LC 103. The hybrid networking sub-layer 250 can generate the hybrid LAN packet using the encapsulation technique as described in FIG. 3 and FIG. 4. In another implementation, the hybrid networking sub-layer 250 generates the hybrid LAN packet using VLAN tags as described in FIGS. 5A and 5B.

Figure 3:
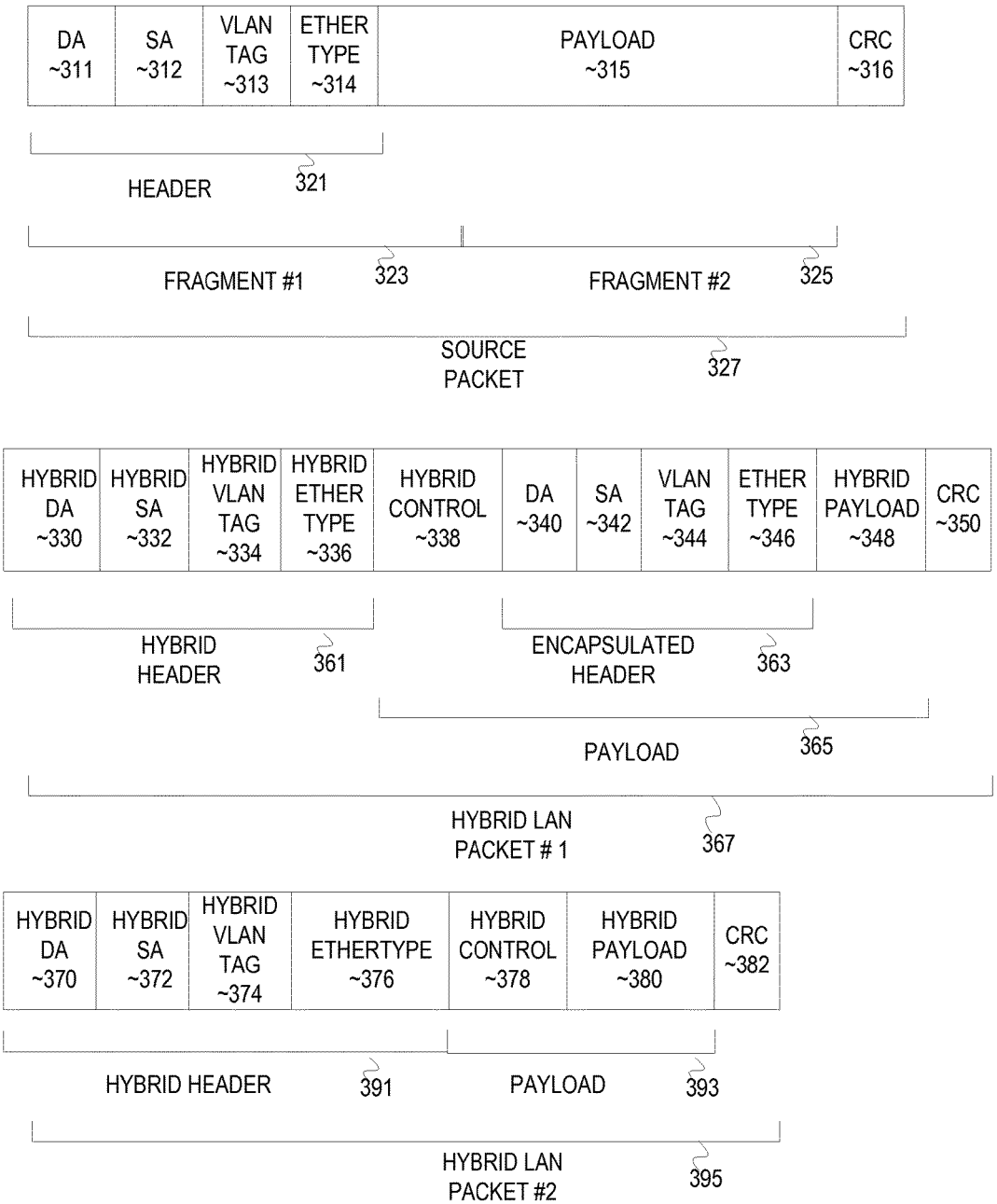
FIG. 3 depicts an example hybrid LAN packet when a packet transmit unit in a hybrid device generates a hybrid LAN packet using an encapsulation technique.

FIG. 3 depicts an example hybrid LAN packet when a packet transmit unit in a hybrid device generates a hybrid LAN packet using an encapsulation technique. In one example, as described at block 285 in FIG. 2B, the HR 110 and the HB 170 are bridged by the LB 140, which acts as a WLAN repeater. The HR 110 and the HB 170 are also connected via the powerline cable plant 105 and via the coaxial cable plant 116 through the LB 120. However, the LB 180 bridges the powerline cable plant 105 connected to its port 181 to the LB 120 via the Ethernet cable 183. The Ethernet cable 183 is connected between the Ethernet ports 182 and 125. The combination of the LB 180 and the LB 120 results in a bridged path between the hybrid ports 114 and 115 of the HR 110. Similarly, the LB 120 and the LB 180 also bridge the communication path between the powerline communication interface 174 and the Ethernet port 175 of the HB 170.

In one example, the LC 177 generates a source packet 327 (e.g., an Ethernet packet) destined to the LC 103. The source packet 327 includes a header 321, a payload 315 and a CRC field 316. The header 321 includes a DA field 311, an SA field 312, a VLAN tag field 313 and an ethertype field 314. The SA field 312 includes the MAC ID of the LC 177, the DA field 311 includes the MAC ID of the LC 103 and the VLAN tag field 313 includes a VLAN tag which may be present based on the network standard (e.g., IEEE 802.1Q). The ethertype field 314 includes a two-octet code which represents a protocol (e.g., IPv4, IPv6, etc.) used for a payload (i.e., data carried by the source packet 327) in the payload, and the CRC field 316 includes a frame check sequence for the data in the payload 315. The path selection unit 176 in the HB 170 determines the DA in the Ethernet packet as the MAC ID of the LC 103, which is connected on the LCI 112 of the HR 110. The path selection unit 176 in the HB 170 determines that the HR 110 can be reached from the port 173 via WLAN, via the powerline communication interface 174 or via the Ethernet port 175. From the topology discovery, the packet transmit unit 178 determines that the HCIs 174 and 175 of the HB 170 are bridged.

In one example, the path selection unit 176 can select the communication path to the HR 110 via either the powerline communication interface 174 or the Ethernet port 175. In both the cases (i.e., for the communication path via the Ethernet port 175 or the powerline communication interface 174), the packet transmit unit 178 generates hybrid LAN packets 367 and 395 for transmission to the HR 110 via the bridged path.

The packet transmit unit 178 splits the source packet 327 into two fragments: a fragment 323 having the header 321 and a part of the payload data in the payload 315, and a fragment 325 having the remaining part of the payload data in the payload 315. In one implementation, the packet transmit unit 178 splits the source packet 327 to prevent a violation of the Ethernet packet length restrictions on the underlying hybrid-networking interface (e.g., the powerline communication interface 174). In some embodiments, the packet transmit unit 178 may split the source packet 327 in more than two fragments.

In the example of FIG. 3, the hybrid LAN packets 367 and 395 conform to the Ethernet packet format. The Hybrid LAN packet 367 corresponds to the fragment 323 and includes a hybrid packet header 361, a payload 365 and a CRC field 350. The hybrid packet header 361 includes a hybrid DA field 330, a hybrid SA field 332, a hybrid VLAN tag field 334, and a hybrid ethertype field 336. The hybrid DA field 330 includes the interface specific MAC ID of the HR 110 to which the packet 367 is destined (i.e., the MAC ID of either the powerline communication interface 114 or the coaxial cable interface 115) and the hybrid SA field 332 is set to the interface specific MAC ID of the HB 170 from which the hybrid LAN packet 367 is transmitted (i.e., the MAC ID of the powerline communication interface 174 or the MAC ID of the Ethernet port 175). The hybrid VLAN tag field 334 marks the VLAN tag that may be present based on the network standard (e.g., IEEE 802.1Q), and the ethertype field 336 is set to a code which represents the hybrid networking protocol used for the payload 365. The payload 365 includes a hybrid control field 338, an encapsulated header 363 and a hybrid payload 348. The hybrid control field 338 includes multiple fields as described in FIG. 4 to control the fragmentation and reassembly of the hybrid LAN packets 367 and 395. The encapsulated header 363 includes a DA field 340, an SA field 342, a VLAN tag field 344, and an ethertype field 346 which correspond to the DA field 311, the SA field 312, the VLAN tag field 313 and the ethertype field 314, respectively. The header 321 is included as the encapsulated header 363 in the payload 365. The hybrid payload 348 includes the part of the payload data in the fragment 323 of the source packet 327. The CRC field 350 is similar to the CRC field 316.

The hybrid LAN packet 395 corresponds to the fragment 325 and includes a hybrid header 391, a payload 393 and a CRC field 382. The hybrid header 391 includes a hybrid DA field 370, a hybrid SA field 372, a hybrid VLAN tag field 374, and a hybrid ethertype field 376. The hybrid DA field 370, the hybrid SA field 372, the hybrid VLAN tag field 374, and the hybrid ethertype field 376 are set to the same values as the hybrid DA field 330, the hybrid SA field 332, the hybrid VLAN tag field 334, and the hybrid ethertype field 336 respectively. The payload 393 includes a hybrid control field 378 similar to the hybrid control field 338 and a hybrid payload 380. The hybrid payload 380 includes the part of the payload data in the fragment 325 of the source packet 327. The CRC field 382 is similar to the CRC field 350. In the example of FIG. 3, the hybrid LAN packet 367 carries the encapsulated header 363 as part of its payload 365. However, in another implementation the hybrid LAN packet 395 can carry the header 321 as the encapsulated header.

FIG. 4 depicts an example concept diagram of a hybrid control field. FIG. 4 depicts a hybrid control field 401 having the same format as the format of the hybrid control fields 338 and 378, as described above with reference to FIG. 3. The hybrid control field 401 includes a hybrid control protocol version field 410, a hybrid control type field 415, a hybrid control length field 420, a sequence number 430, a fragment number 440 and a last fragment field 445. The hybrid control protocol version field 410 includes the protocol version which is set to a pre-determined value, and allows a recipient of the hybrid control field 401 to determine the features and format of the hybrid control field supported by a transmitting device. The hybrid control type field 415 includes the type of the respective hybrid-LAN packet (e.g., configuration data) which allows the recipient to determine how the subsequent fields in the hybrid control field 401 are interpreted.

The hybrid control type field 415 indicates whether the respective hybrid LAN packet is a data packet, a control packet, etc. The hybrid control length field 420 includes the length of the ensuing fields of the hybrid control field. The sequence number 430 indicates the sequence number of the respective hybrid LAN packet and the fragment number 440 indicates the fragment number of the respective hybrid LAN packet when a source packet is split into multiple fragments such that each fragment corresponds to a hybrid LAN packet. When the last fragment field 445 is set, this indicates that the respective hybrid LAN packet is the the last of a series of the multiple fragments.

In one implementation, a packet transmit unit in a source hybrid device maintains a separate counter for sequence numbers of hybrid LAN packets transmitted to each of the destination hybrid devices. The source hybrid device allocates fragment numbers to hybrid-LAN packets using a running sequence of numbers starting from a predetermined value (e.g., zero). The hybrid source device resets the running sequence for a new sequence number. Hence, the hybrid-LAN packets corresponding to the same source packet have the same sequence number with different fragment numbers. In other implementations, the packet transmit unit can utilize other numbering schemes for allocating sequence numbers.

On receiving the hybrid LAN packets 367 and 395, the recipient HR 110 (as mentioned with reference to FIG. 3) performs reassembly of the hybrid LAN packets using the sequence number 430 and the fragment number 440 (as mentioned in the hybrid control field 401 with reference to FIG. 4) to reconstruct the original source packet 327. The HR 110 forwards the reconstructed packet to the LC 103.

FIG. 5A depicts an example hybrid LAN packet when a packet transmit unit in a hybrid device generates a hybrid LAN packet using VLAN tags. The packet transmit unit in the hybrid device can utilize the VLAN tags to represent the address of the devices locally connected to the hybrid device. For example, a hybrid device associates a unique tag to each of the network devices that are locally connected to the hybrid device at its LCIs. The hybrid device can then share the tags of the locally connected devices with other hybrid devices in a hybrid network. In one implementation, the hybrid device shares the tags of the locally connected devices with the hybrid devices in the hybrid network during the topology discovery phase.

With reference to the example in FIG. 5A, the LC 177 generates a source packet 525 (i.e., an Ethernet packet in the present example) destined to the LC 103. In some implementations, the source packet 525 includes a header 521, a payload 515 and a CRC field 516. The header 521 includes a DA field 511, an SA field 512, a VLAN tag field 513 and an ethertype field 514. The SA field 512 includes the MAC ID of the LC 177, the DA field 511 includes the MAC ID of the LC 103, the VLAN tag field 513 includes a VLAN tag which may be present based on the network standard (e.g., IEEE 802.1Q). The ethertype field 514 includes a two-octet code which represents a protocol (e.g., IPv4, IPv6, etc.) used for a payload (i.e., data carried by the source packet 327) in the payload and the CRC field 516 which includes a frame check sequence for the data in the payload 515. The VLAN tag field 513, the ethertype field 514 and the payload 515 together constitute a source packet segment 523.

In the example of FIG. 5A, when the path selection unit 176 in the HB 170 selects the communication path to the HR 110 via the powerline communication interface 174 or the Ethernet port 175, the packet transmit unit 178 generates a hybrid LAN packet 555. The hybrid LAN packet 555 includes a hybrid header 551, a source packet segment 553 and a CRC field 542. The hybrid header 551 includes a hybrid DA field 530, a hybrid SA field 532 and a hybrid VLAN tag field 534. The source packet segment 553 includes a VLAN tag field 536, an ethertype field 538 and a payload 540. The packet transmit unit 178 sets the hybrid DA field 530 as the interface specific MAC ID of the HR 110 (i.e., the MAC ID of the powerline communication interface 114 or the coaxial cable port 115) to which the hybrid LAN packet 555 is destined. The packet transmit unit 178 sets the hybrid SA 532 as the interface specific MAC ID of the HB 170 (i.e., the MAC ID of the powerline communication interface 174 or the Ethernet port 175) from which the source packet 555 is transmitted. The packet transmit unit 178 sets the hybrid VLAN tag field 534 as the unique tag of the LC 103 (the HR 110 communicates the unique tag of the LC 103 to the HB 170 during topology discovery). The hybrid VLAN tag field 534 allows mapping the entry in the DA field 511 of the source packet 525 to the hybrid DA field 530. In one implementation, the packet transmit unit 178 utilizes the VLAN ID (VID) field of the Tag Control Identifier (TCI) in the VLAN tag to transmit the unique tag information of the locally connected device.

In some implementations, the source packet segment 553 of the hybrid LAN packet 555 is identical to the source packet segment 523 of the source packet 525. The VLAN tag field 536 includes the VLAN tag of the source packet 525 (i.e., the entry in the VLAN tag field 513). The ethertype field 538 includes the same entries as the ethertype field 514. The payload 540 includes the data in the payload 540. The CRC field 542 includes the same entries as the CRC field 516.

The unique tag information in the example 5A refers to a unique tag per local connectivity interface as determined by a destination hybrid device. The unique tag per local connectivity interface results in the communication of the DA of LC 103 over the hybrid LAN network and a loss of the SA of the LC 177 at the recipient hybrid router 110. In one implementation, the HR 110 reconstructs an estimate of the source packet by utilizing the entry in the hybrid SA field 532 as the SA of the reconstructed packet forwarded to the LC 103.

In some embodiments, the packet transmit unit 107 in the HR 110 may extend the unique tag information of the LC 103 to a source and destination device pair. The extension of the unique tag information allows the HR 110 to reconstruct the source packet 525 from the hybrid LAN packet 555 prior to transmitting the reconstructed source packet to the LC 103. The packet transmit unit 107 can extend the unique tag information by replacing Hybrid VLAN tag field 534 in hybrid LAN packet 555 with a pair of stacked VLAN tags mapped to the MAC ID of the LC 103 and the MAC ID of the LC 177, respectively. In other embodiments, a source hybrid device and a destination hybrid device may negotiate a unique tag corresponding to the source and the destination device pair.

Figure 5B:
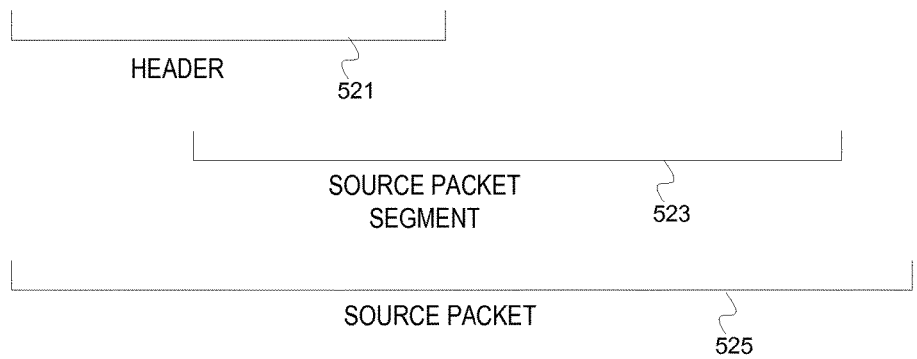
FIG. 5B depicts an example concept diagram of a hybrid LAN packet with stacked hybrid VLAN tags.
Figure 5B:
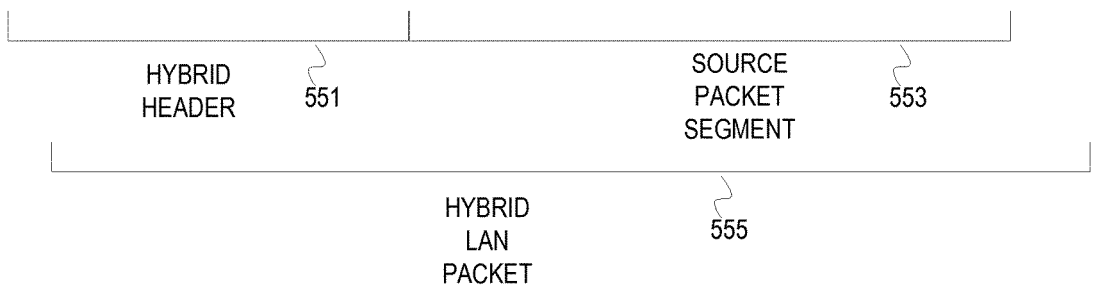

FIG. 5B depicts an example concept diagram of a hybrid LAN packet with stacked hybrid VLAN tag fields 535 and 537. The source packet 525 and the hybrid LAN packet 555 in FIG. 5B are identical to the source packet 525 and the hybrid LAN packet 555 in FIG. 5A, except that the hybrid VLAN tag field 534 in FIG. 5A is replaced by stacked hybrid VLAN tag fields 535 and 537 in FIG. 5B. The hybrid VLAN tag fields 535 and 537 include entries that are mapped to the entries in the DA field 511 and the SA field 512, respectively.

Figure 6:
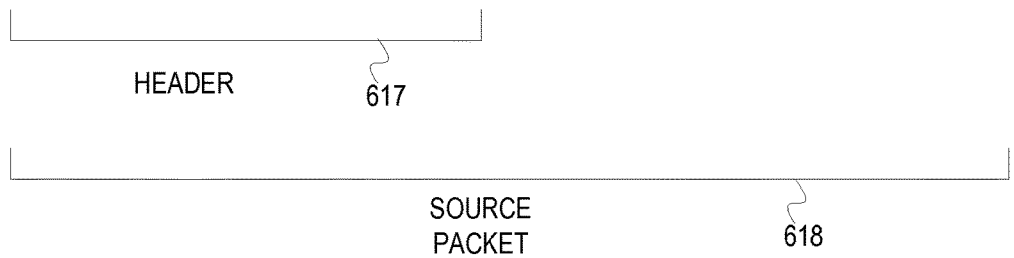
FIG. 6 depicts an example hybrid LAN packet when a packet transmit unit in a hybrid device generates a hybrid LAN packet for transmission to a directly connected device on a bridged hybrid path.
Figure 6:
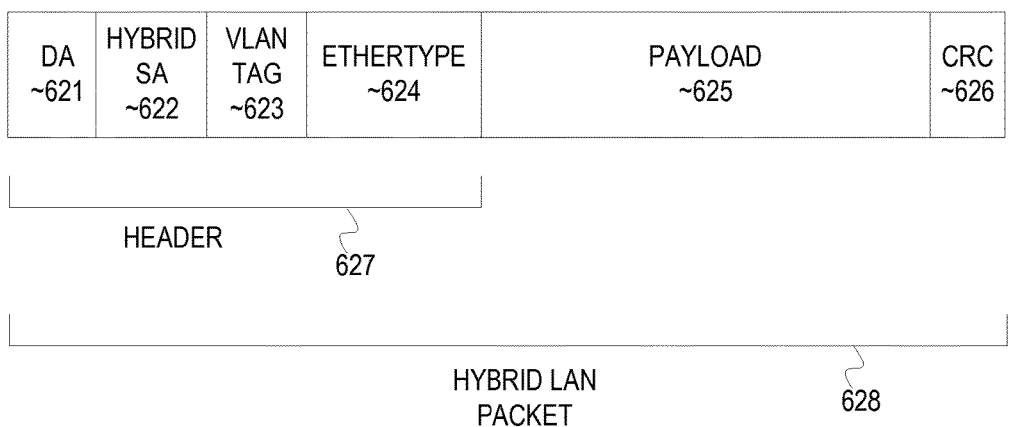

FIG. 6 depicts an example hybrid LAN packet when a packet transmit unit in a hybrid device generates a hybrid LAN packet for transmission to a directly connected device on a bridged hybrid path, as described at block 278 in FIG. 2B.

In one example, with reference to the hybrid network 100 as described above with reference to FIG. 1, a source packet may originate from the LC 103 and may be destined to the LC 124. The HR 110 and the LC 124 are connected via powerline interface on port 114 on the HR 110 through the powerline to Ethernet bridge LB 180 and the coaxial to the Ethernet bridge LB 120. The HR 110 and the LC 124 are also connected via the coaxial cable plant 116 on the port 115 through the coaxial to Ethernet bridge LB 120. The path selection unit 106 in the HR 110 determines that the LC 124 is a directly connected device to the HR 110 via a bridged hybrid path (bridged by the LB 180 and the LB 120). The path selection unit 106 may select the communication path to the LC 124 via the powerline communication interface 114 or via the coaxial cable interface 115. Based on the communication path selected by the path selection unit 106, the packet transmit unit 107 replaces the address in SA field of the source packet with the interface specific MAC ID of the HCI (i.e., powerline communication interface 114 or the coaxial cable interface 115) in a hybrid LAN packet.

FIG. 6 depicts a source packet 618 and a hybrid LAN packet 628. The source packet 618 is the network packet (i.e., an Ethernet packet in the depicted embodiment) originating from the LC 103. The packet transmit unit (i.e., the packet transmit unit 107 in the example described above) in the hybrid device (i.e., the HR 110 in the example described above) generates the hybrid LAN packet 628. In one implementation, the source packet 618 includes a header 617, a payload 615 and a cyclic redundancy check (CRC) field 616. The header 617 includes a DA field 611, an SA field 612, a VLAN tag field 613 and an ethertype field 614. The SA field 612 includes the MAC ID of the LC 103, the DA field 611 includes the MAC ID of the LC 124, and the VLAN tag field 613 includes a VLAN tag which may be present based on the network standard (e.g., IEEE 802.1Q). The ethertype field 614 includes a two-octet code which represents a protocol (e.g., IPv4, IPv6, etc.) used for a payload (i.e., data carried by the source packet 618) in the payload and the cyclic redundancy check field 616 which includes a frame check sequence for the data in the payload 615.

The hybrid LAN packet 628 may have a similar format as the source packet 618. In one implementation, the hybrid LAN packet 628 includes a header 627, a payload 625 and a CRC field 626. The header 627 includes a DA field 621, a hybrid SA field 622, a VLAN tag field 623 and an ethertype field 624. The entries in the DA field 621, the VLAN tag field 623, the ethertype field 624, the payload 625 and the CRC field 626 are the same as the entries in the DA field 611, the VLAN tag field 613, the ethertype field 614, the payload 615 and the CRC field 616, respectively. The packet transmit unit 107 replaces the MAC ID in the SA field 612 with the interface specific MAC ID of the HCI (i.e., the powerline communication interface 114 or the coaxial cable interface 115) from which the hybrid LAN packet 628 is transmitted.

The concept diagrams and techniques depicted in FIGS. 1-6 are examples meant to aid in understanding embodiments. Embodiments may comprise additional system components, different system components, and/or may perform additional operations, fewer operations, operations in a different order, operations in parallel, and some operations differently. It is noted that in the description of FIGS. 1-6, all possible communication paths between the network devices in the hybrid network 100 are not described. FIGS. 1-6 describe communication paths to illustrate different techniques of generating hybrid LAN packets to the network devices in the hybrid network 100.

It is also noted that the Hybrid Control field format described in FIG. 4 is extensible to future enhancements of the hybrid networking protocol as described in the present embodiments, while maintaining backwards compatibility to devices embodying the methods of the present embodiments. (e.g., by incrementing the hybrid protocol version 410 and/or by adding a new packet-type in hybrid control type field 415). One example of such enhancements is the extension of the methods described herein to enable multi-hop or mesh networking techniques between hybrid-LAN devices. In multi-hop transmission, the optimal route between traffic source and sink may have more than two hybrid devices in the interim. To facilitate such enhancements, the hybrid control field 401 may be extended to accommodate additional addresses—representing the MAC IDs of the intermediate hybrid devices in the network.

It is further noted that the techniques described in the present embodiments are extensible to further enhancements of the hybrid networking protocol. For example, enabling multi-hop or mesh networking techniques between hybrid-LAN devices. The techniques to generate a hybrid LAN packet may be extended to include additional VLAN tags that specify for instance the address(es) of the intermediate hybrid LAN device(s) between a source network device and a destination network device.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine-readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
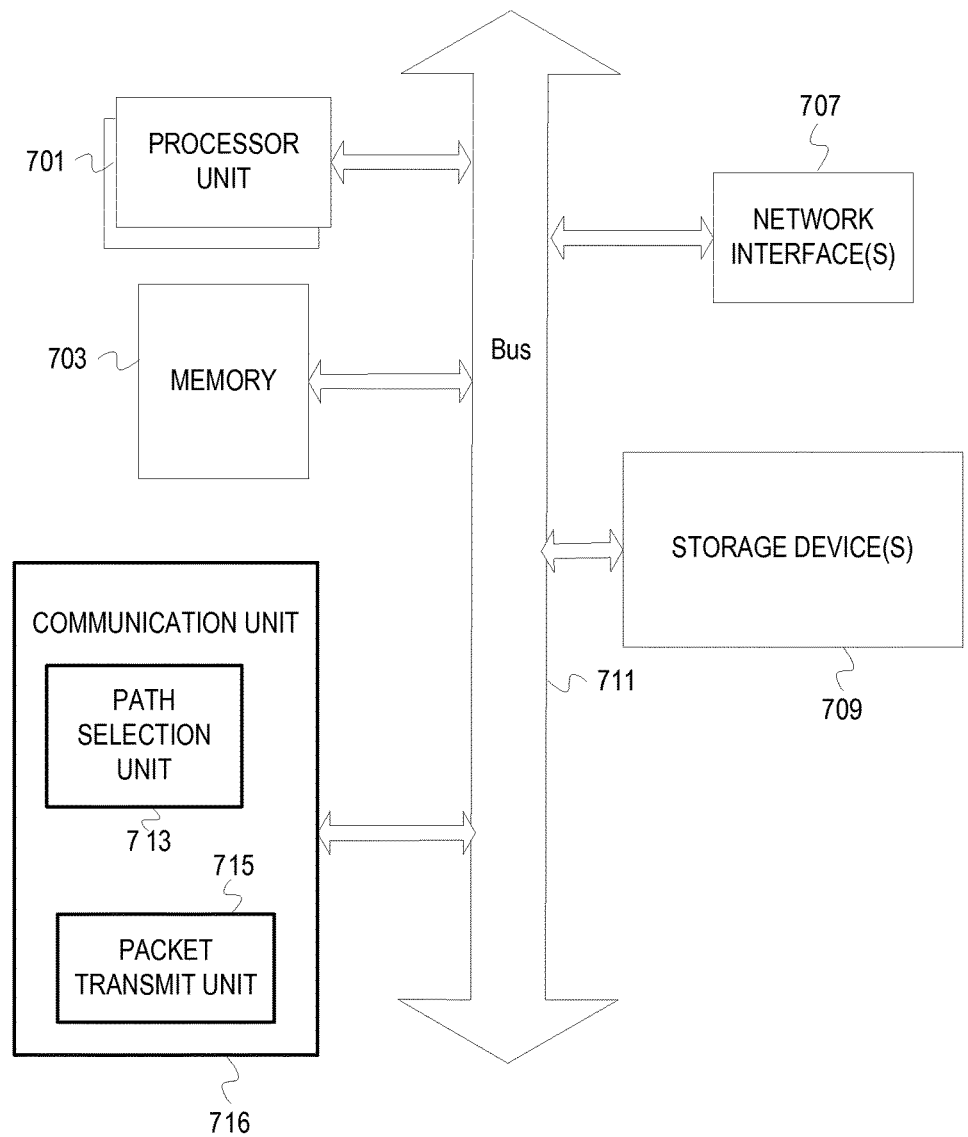
FIG. 7 depicts an example hybrid device.

FIG. 7 depicts an example hybrid device 700. In some implementations, the hybrid device 700 may be one of a desktop computer, laptop computer, a tablet computer, a mobile phone, a smart appliance, a powerline communication device, a gaming console, network bridging devices, or other electronic systems comprising a hybrid communication unit configured to communicate across multiple communication networks. The hybrid device 700 includes a processor unit 701 (possibly including multiple processors, multiple cores, multiple nodes, and/or implementing multi-threading, etc.). The hybrid device 700 includes a memory 703. The memory 703 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The hybrid device 700 also includes a bus 711 (e.g., PCI, PCI-Express, AHB™, AXI™, NoC, etc.), a network interface(s) 707 (e.g., a powerline communication interface, an Ethernet interface, a coaxial cable interface, a wireless interface, etc.), and a storage device(s) 709 (e.g., optical storage, magnetic storage, network attached storage, etc.). The hybrid device 700 includes a communication unit 716 having a path selection unit 713 and a packet transmit unit 715. The path selection unit 713 and the packet transmit unit 715 implement the functionalities of the path selection unit 106 and the packet transmit unit 107, respectively, as described above with reference to FIG. 1. Also, as described above, the path selection unit 713 and the packet transmit unit 715 may include one or more functionalities to implement a hybrid networking sub-layer in the hybrid device 700. Any one of these functionalities may be partially (or entirely) implemented in hardware or in the memory 703. For example, the functionality may be implemented with an application specific integrated circuit, in logic implemented in the processor unit 701, in a co-processor on a peripheral device or card, etc. In some implementations, the communication unit 716 may be implemented in a single chip (e.g., a system-on-a-chip or other type of IC), or in multiple chips on a circuit board. In some implementations, the communication unit 716 and the network interface(s) 707 may be implemented in one or more chips of a network interface card (NIC). Also, in some implementations, the hybrid device 700 may be implemented using a plurality of chips in one or more circuit boards. Further, realizations may include fewer or additional components not illustrated in FIG. 7 (e.g., video cards, audio cards, additional network interfaces, peripheral devices, etc.). The processor unit 701, the storage device(s) 709, the communication unit 716, and the network interface(s) 707 are coupled to the bus 711. Although illustrated as being coupled to the bus 711, the memory 703 may be coupled to the processor unit 701.

While the embodiments are described with reference to various implementations and exploitations, it will be understood that these embodiments are illustrative and that the scope of the inventive subject matter is not limited to them. In general, techniques for implementing a mechanism for generating a hybrid LAN packet for transmission of data to a destination network device in a hybrid network based on path connection characteristics associated with a selected network path as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a first hybrid network device for communication in a hybrid communication network, the method comprising:
   determining to transmit a source packet to a destination network device of the hybrid communication network, wherein the first hybrid network device comprises a plurality of network interfaces associated with a plurality of available network communication paths for transmitting the data to the destination network device, wherein the first hybrid network device utilizes a first network communication technology for transmitting data via at least a first network interface, and utilizes a second network communication technology for transmitting data via at least a second network interface;
   selecting a network communication path from the plurality of available network communication paths for transmitting the data from the first hybrid network device to the destination network device via a second hybrid network device;
   determining whether the network communication path comprises a bridged path or an un-bridged path of the hybrid communication network, wherein the network communication path comprises the bridged path when the first and second network interfaces of the first hybrid network device are communicatively coupled via one or more bridge devices, and wherein the first hybrid network device can selectively use either of the first network interface or the second network interface for transmitting the data via the bridged path;
   generating a hybrid network packet for transmitting at least part of the source packet via the second hybrid network device to the destination network device based, at least in part, on whether the network communication path comprises the bridged path or the un-bridged path to the second hybrid network device; and
   transmitting the hybrid network packet to the second hybrid network device via the selected network communication path.

2. The method of claim 1, further comprising:
   determining that the hybrid communication network does not comprise the bridged path,
   wherein generating the hybrid network packet comprises including a source address of a source network device and a destination address of the destination network device in a hybrid packet header of the hybrid network packet.

3. The method of claim 2, wherein the source network device is the first hybrid network device or a separate network device coupled with the first hybrid network device.

4. The method of claim 1, further comprising:
   determining that the hybrid communication network comprises the bridged path,
   wherein generating the hybrid network packet comprises including a hybrid source address field having an address of the first hybrid network device as a source address in a hybrid packet header of the hybrid network packet.

5. The method of claim 4, further comprising:
   determining whether the network communication path directly connects the first hybrid network device to the destination network device,
      wherein the first hybrid network device is directly connected to the destination network device using the one or more bridge devices, and wherein said generating the hybrid network packet is further based, at least in part, on whether the network communication path directly connects the first hybrid network device to the destination network device.

6. The method of claim 1, further comprising:
receiving the source packet from a source network device coupled with the first hybrid network device,
wherein generating the hybrid network packet comprises including a hybrid source address field that replaces a source address field of the source packet.

7. The method of claim 1, further comprising:
receiving the source packet from a source network device coupled with the first hybrid network device; and
determining that the hybrid communication network comprises the bridged path,
wherein generating the hybrid network packet comprises generating two or more hybrid network packets for transmission to the second hybrid network device, each of the two or more hybrid network packets including a hybrid header, a hybrid control field, and a part of the source packet.

8. The method of claim 7, wherein said generating the two or more hybrid network packets comprises:
splitting the source packet into at least a first fragment and a second fragment;
generating a first hybrid network packet including a first hybrid header, a first hybrid control field, and the first fragment; and
generating a second hybrid network packet including a second hybrid header, a second hybrid control field, and the second fragment.

9. The method of claim 7, wherein the hybrid header includes at least a destination address and a source address, and the hybrid control field includes at least protocol version information and packet type information.

10. The method of claim 1,
wherein the hybrid network packet includes one or more hybrid virtual local area network address fields.

11. The method of claim 10, wherein the one or more hybrid virtual local area network address fields include address information associated with a source network device coupled with the first hybrid network device and address information associated with the second hybrid network device.

12. The method of claim 1, further comprising:
receiving, at the first hybrid network device, the source packet from a source network device of the hybrid communication network.

13. The method of claim 1, further comprising:
ranking the plurality of available network communication paths between the first hybrid network device and the destination network device,
wherein the network communication path is selected based, at least in part, on said ranking.

14. The method of claim 1,
wherein the first hybrid network device and the second hybrid network device implement hybrid networking sub-layers, and
wherein generating the hybrid network packet comprises generating a hybrid packet header associated with the hybrid networking sub-layers of the first and second hybrid network devices.

15. The method of claim 14,
wherein the hybrid packet header is different from a packet header included in the source packet.

16. The method of claim 14,
wherein the hybrid packet header includes a hybrid virtual local area network (VLAN) tag associated with the hybrid communication network.

17. A first hybrid network device comprising:
a plurality of network interfaces associated with a plurality of available network communication paths for transmitting data to a destination network device of a hybrid communication network, wherein the first hybrid network device utilizes a first network communication technology for transmitting data via at least a first network interface, and utilizes a second network communication technology for transmitting data via at least a second network interface;
a path selection unit configured to:
determine to transmit a source packet to the destination network device;
select a network communication path from a plurality of available network communication paths for transmitting data from the first hybrid network device to a destination network device via a second hybrid network device; and
a packet transmit unit coupled with the path selection unit, the packet transmit unit configured to:
determine whether the network communication path comprises a bridged path or an un-bridged path of the hybrid communication network, wherein the network communication path comprises the bridged path when the first and second network interfaces of the first hybrid network device are communicatively coupled via one or more bridge devices, and wherein the first hybrid network device can selectively use either of the first network interface or the second network interface for transmitting the data via the bridged path;
generate a hybrid network packet for transmitting at least part of the source packet via the second hybrid network device to the destination network device based, at least in part, on whether the network communication path comprises the bridged path or the un-bridged path to the second hybrid network device; and
transmit the hybrid network packet to the second hybrid network device via the selected network communication path.

18. The first hybrid network device of claim 17, wherein the packet transmit unit is further configured to:
determine that the hybrid communication network does not comprise the bridged path, wherein a source network device is the first hybrid network device or a separate network device coupled with the first hybrid network device,
wherein the packet transmit unit configured to generate the hybrid network packet comprises the packet transmit unit configured to include a source address of the source network device and a destination address of the destination network device in a hybrid packet header of the hybrid network packet.

19. The first hybrid network device of claim 17, wherein the packet transmit unit is further configured to:
determine that the hybrid communication network comprises the bridged path,
wherein the packet transmit unit configured to generate the hybrid network packet comprises the packet transmit unit configured to include a hybrid source address field having an address of the first hybrid network device as a source address in a hybrid packet header of the hybrid network packet.

20. The first hybrid network device of claim 17, wherein the packet transmit unit is further configured to:
receive the source packet from a source network device coupled with the first hybrid network device,
wherein the packet transmit unit configured to generate the hybrid network packet comprises the packet transmit unit configured to include a hybrid source address field that replaces a source address field of the source packet.

21. The first hybrid network device of claim 17, wherein the packet transmit unit is further configured to:
receive the source packet from a source network device coupled with the first hybrid network device;
determine that the hybrid communication network comprises the bridged path; and
generate two or more hybrid network packets for transmission to the second hybrid network device, each of the two or more hybrid network packets including a hybrid header, a hybrid control field, and a part of the source packet.

22. The first hybrid network device of claim 21, wherein the packet transmit unit is further configured to:
split the source packet into at least a first fragment and a second fragment;
generate a first hybrid network packet including a first hybrid header, a first hybrid control field, and the first fragment; and
generate a second hybrid network packet including a second hybrid header, a second hybrid control field, and the second fragment.

23. The first hybrid network device of claim 21, wherein the hybrid header includes at least a destination address and a source address, and the hybrid control field includes at least protocol version information and packet type information.

24. The first hybrid network device of claim 17, wherein the hybrid network packet includes one or more hybrid virtual local area network address fields.

25. The first hybrid network device of claim 24, wherein the one or more hybrid virtual local area network address fields include address information associated with a source network device coupled with the first hybrid network device and address information associated with the second hybrid network device.

26. The first hybrid network device of claim 17, wherein the path selection unit is further operable to:
rank the plurality of available network communication paths between the first hybrid network device and the destination network device,
wherein the network communication path is selected based, at least in part, on the ranking.

27. A non-transitory machine-readable storage medium having instructions stored therein, which when executed by a processor of a first hybrid network device, cause the processor to perform operations that comprise:
determining to transmit a source packet to a destination network device of a hybrid communication network, wherein the first hybrid network device comprises a plurality of network interfaces associated with a plurality of available network communication paths for transmitting the data to the destination network device, wherein the first hybrid network device utilizes a first network communication technology for transmitting data via at least a first network interface, and utilizes a second network communication technology for transmitting data via at least a second network interface;
selecting a network communication path from the plurality of available network communication paths for transmitting the data from the first hybrid network device to the destination network device via a second hybrid network device;
determining whether the network communication path comprises a bridged path or an un-bridged path of the hybrid communication network, wherein the network communication path comprises the bridged path when the first and second network interfaces of the first hybrid network device are communicatively coupled via one or more bridge devices, and wherein the first hybrid network device can selectively use either of the first network interface or the second network interface for transmitting the data via the bridged path;
generating a hybrid network packet for transmitting at least part of the source packet via the second hybrid network device to the destination network device based, at least in part, on whether the network communication path comprises the bridged path or the un-bridged path to the second hybrid network device; and
transmitting the hybrid network packet to the second hybrid network device via the selected network communication path.

28. The non-transitory machine-readable storage medium of claim 27, wherein said operations further comprise:
determining that the hybrid communication network does not comprise the bridged path, wherein a source network device is the first hybrid network device or a separate network device coupled with the first hybrid network device,
wherein generating the hybrid network packet comprises including a source address of the source network device and a destination address of the destination network device in a hybrid packet header of the hybrid network packet.

29. The non-transitory machine-readable storage medium of claim 27, wherein said operations further comprise:
determining that the hybrid communication network comprises the bridged path,
wherein generating the hybrid network packet comprises including a hybrid source address field having an address of the first hybrid network device as a source address in a hybrid packet header of the hybrid network packet.

30. The non-transitory machine-readable storage medium of claim 27, wherein said operations further comprise:
receiving the source packet from a source network device coupled with the first hybrid network device; and
determining that the hybrid communication network comprises the bridged path,
wherein generating the hybrid network packet comprises generating two or more hybrid network packets for transmission to the second hybrid network device, each of the two or more hybrid network packets including a hybrid header, a hybrid control field, and a part of the source packet.

31. The non-transitory machine-readable storage medium of claim 27, wherein the hybrid network packet includes one or more hybrid virtual local area network address fields.

* * * * *